United States Patent
Kobayashi

(10) Patent No.: US 10,349,010 B2
(45) Date of Patent: Jul. 9, 2019

(54) IMAGING APPARATUS, ELECTRONIC DEVICE AND IMAGING SYSTEM

(71) Applicant: Panasonic Intellectual Property Management Co., Ltd., Osaka (JP)

(72) Inventor: Hideto Kobayashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/669,285

(22) Filed: Aug. 4, 2017

(65) Prior Publication Data

US 2017/0359552 A1     Dec. 14, 2017

Related U.S. Application Data

(63) Continuation of application No. PCT/JP2017/003279, filed on Jan. 31, 2017.

(30) Foreign Application Priority Data

Mar. 7, 2016   (JP) ................................. 2016-043802

(51) Int. Cl.
    *H04N 7/15*     (2006.01)
    *H04N 5/232*    (2006.01)
    (Continued)

(52) U.S. Cl.
    CPC ......... *H04N 7/152* (2013.01); *H04N 5/23229* (2013.01); *H04N 5/265* (2013.01);
    (Continued)

(58) Field of Classification Search
    CPC .... H04N 5/23229; H04N 5/265; H04N 5/781; H04N 5/9205; H04N 5/85; H04N 7/152
    See application file for complete search history.

(56) References Cited

U.S. PATENT DOCUMENTS 5,801,756 A      9/1998   Iizawa
9,743,042 B1 *   8/2017   Faulkner ............. H04L 65/1063
                          (Continued)

FOREIGN PATENT DOCUMENTS

JP      8-149440     6/1996
JP      11-127369    5/1999
                     (Continued)

OTHER PUBLICATIONS

International Search Report of PCT application No. PCT/JP2017/003279 dated Apr. 18, 2017.

*Primary Examiner* — Lin Ye
*Assistant Examiner* — John H. Morehead, III
(74) *Attorney, Agent, or Firm* — Wenderoth, Lind & Ponack, L.L.P.

(57) ABSTRACT

An imaging apparatus includes: a first imaging unit that captures an image of a subject and generates first video data; a first communication unit that communicates with a plurality of electronic devices, and receives second video data generated by the plurality of electronic devices and evaluation information indicating priorities of the second video data; an image processor that performs synthesis processing of synthesizing a first video and a second video, the first video being indicated by the first video data, and the second video being indicated by the second video data received from at least one electronic device of the plurality of electronic devices; and a first controller that controls the synthesis processing in the image processor. The first controller selects the at least one electronic device of the plurality of electronic devices based on the evaluation information received from each of the plurality of electronic devices, the at least one electronic device providing the second video data to be used for the synthesis processing.

19 Claims, 16 Drawing Sheets

(51) Int. Cl.
  *H04N 5/265* (2006.01)
  *H04N 5/85* (2006.01)
  *H04N 5/92* (2006.01)
  *H04N 5/781* (2006.01)
  *H04N 5/77* (2006.01)
  *H04N 5/907* (2006.01)

(52) U.S. Cl.
  CPC ............. *H04N 5/772* (2013.01); *H04N 5/781* (2013.01); *H04N 5/85* (2013.01); *H04N 5/9205* (2013.01); *H04N 5/907* (2013.01)

(56) References Cited

U.S. PATENT DOCUMENTS

| | | | |
|---|---|---|---|
| 2006/0038897 A1 | 2/2006 | Sakimura et al. | |
| 2012/0038742 A1* | 2/2012 | Robinson | H04N 7/142 348/14.16 |
| 2012/0314015 A1* | 12/2012 | Watson | H04N 7/15 348/14.1 |
| 2014/0036027 A1* | 2/2014 | Liu | H04N 7/157 348/14.07 |
| 2014/0043495 A1* | 2/2014 | Bateman | H04N 7/181 348/207.11 |
| 2014/0192198 A1* | 7/2014 | Tsau | H04N 21/41407 348/159 |
| 2016/0134838 A1* | 5/2016 | Tangeland | H04N 7/142 348/14.09 |
| 2016/0198097 A1* | 7/2016 | Yewdall | H04N 5/265 348/659 |
| 2017/0237941 A1* | 8/2017 | Vats | G06K 9/3233 348/14.07 |

FOREIGN PATENT DOCUMENTS

| | | |
|---|---|---|
| JP | 2005-123807 | 5/2005 |
| JP | 2007-158860 | 6/2007 |
| JP | 2007-173963 | 7/2007 |
| JP | 2014-107775 | 6/2014 |

\* cited by examiner

| SUB CAMERA | DEVICE NAME |
|---|---|
| SUB CAMERA 1 | smart_phone_a |
| SUB CAMERA 2 | smart_phone_b |
| SUB CAMERA 3 | smart_phone_c |

FIG. 13

| PARAMETER | VARIABLE NAME | VALUE | | WHEN PRIORITY IS GIVEN TO DETECTION OF PLURAL PERSONS | WHEN PRIORITY IS GIVEN TO DETECTION OF ONE PERSON |
|---|---|---|---|---|---|
| NUMBER OF DETECTED FACES | Fn | NO ONE IS DETECTED | | 0 | 0 |
| | | ONE PERSON IS DETECTED | | 0.3 | 1.0 |
| | | TWO PERSONS ARE DETECTED | | 0.6 | 0.6 |
| | | THREE OR MORE PERSONS ARE DETECTED | | 1.0 | 0.3 |
| VOLUME | Vn | 0 TO 1 | | | |
| | | 0: NO VOICE IS DETECTED (SILENCE) | | | |
| | | 1: PREDETERMINED THRESHOLD VALUE OR MORE OF VOLUME | | | |
| VARIATION OF INCLINATION OF SMARTPHONE | Jn | 0 TO 1 | | | |
| | | 0: SUBSTANTIALLY STILL (NOT CHANGED) | | | |
| | | 1: PREDETERMINED THRESHOLD VALUE OR MORE OF VARIATION | | | |

IMAGING APPARATUS, ELECTRONIC DEVICE AND IMAGING SYSTEM

BACKGROUND

1. Technical Field

The present disclosure relates to an imaging apparatus, which is capable of receiving video data from a plurality of external devices, and capable of recording an image obtained by synthesizing an image indicating the received video data and an image captured by the apparatus itself.

2. Description of the Related Art

PTL 1 discloses an electronic camera that synthesizes electronic images of a plurality of channels with each other. The electronic camera disclosed in PTL 1 synthesizes sub electronic images, which are acquired by an acquisition unit, with a main electronic image generated by an imaging unit. At that time, the sub electronic images are adjusted to a size smaller than a size of the main electronic image, and are synthesized with the main electronic image. A sub scene, in which a significant change has occurred in the sub electronic images, is detected. When the sub scene is detected, the size or synthesis mode of the sub electronic image representing the sensed sub scene is changed, and this sub electronic image is emphasized. In this way, necessary and sufficient information is transmitted to a viewer, and visibility of a synthetic image is enhanced.

CITATION LIST

Patent Literatures

PTL 1: Unexamined Japanese Patent Publication No. 2014-107775

PTL 2: Unexamined Japanese Patent Publication No. 2007-173963

SUMMARY

The present disclosure provides an imaging apparatus, which is capable of receiving video data from a plurality of external devices, and capable of recording an image obtained by synthesizing an image indicating the received video data and an image captured by the apparatus itself.

A first aspect of the present disclosure provides an imaging apparatus. An imaging apparatus includes: a first imaging unit that captures an image of a subject and generates first video data; a first communication unit that communicates with a plurality of electronic devices, and receives second video data generated by the plurality of electronic devices and evaluation information indicating priorities of the second video data; an image processor that performs synthesis processing of synthesizing a first video and a second video, the first video being indicated by the first video data, and the second video being indicated by the second video data received from at least one electronic device of the plurality of electronic devices; and a first controller that controls the synthesis processing in the image processor. The first controller selects the at least one electronic device of the plurality of electronic devices based on the evaluation information received from each of the plurality of electronic devices, the at least one electronic device providing the second video data to be used for the synthesis processing.

A second aspect of the present disclosure provides an electronic device that transmits the second video data to the above imaging apparatus. The electronic device includes: a second imaging unit that captures an image of a subject and generates the second video data; a second communication unit that communicates with the imaging apparatus; and a second controller that calculates the evaluation information, and controls transmission of the second video data and the evaluation information to the imaging apparatus. The second controller transmits the second video data and the evaluation information to the imaging apparatus upon receipt of a distribution start request for the second video data from the imaging apparatus, and thereafter, upon receipt of a distribution stop request for the second video data from the imaging apparatus, stops transmission of the second video data to the imaging apparatus, and transmits the evaluation information to the imaging apparatus.

In accordance with the imaging apparatus of the present disclosure, from among the videos received from the plurality of electronic devices, the video to be used for the synthesis is automatically set based on the evaluation information for the video information. In this way, in setting work for the video to be used for the synthesis in the state where the plurality of electronic devices are connected to the imaging apparatus, the convenience for the user can be enhanced.

BRIEF DESCRIPTION OF THE DRAWINGS

FIG. 13 is a view showing examples of parameters of Formula (1) according to the first exemplary embodiment;

DETAILED DESCRIPTION

Exemplary embodiments will be described below in detail with reference to the drawings as appropriate. However, a description in detail more than necessary is omitted in some cases. For example, a detailed description of well-known matters and a duplicate description of substantially the same configuration are omitted in some cases. These omissions are made in order to avoid unnecessary redundancy of the following description and to facilitate the understanding of those skilled in the art. Note that the inventors of the present disclosure provide the accompanying drawings and the following description in order to allow those skilled in the art to fully understand the present disclosure, and do not intend to thereby limit the subject of the description of the scope of claims.

First Exemplary Embodiment

Figure 1:
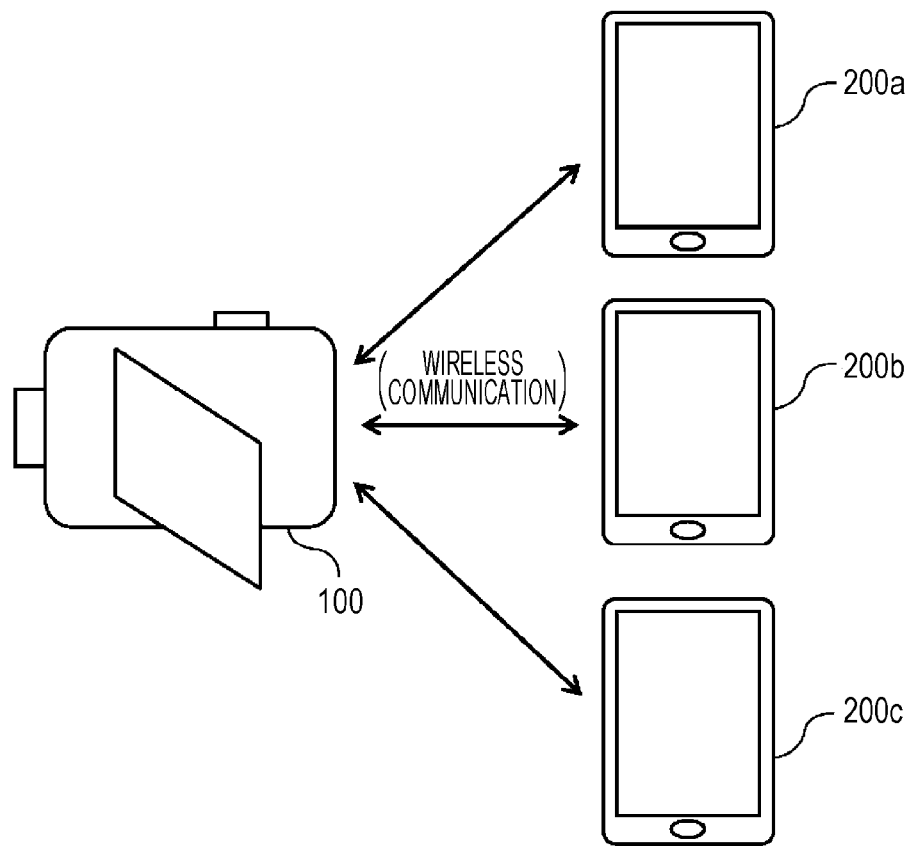
FIG. 1 is a view showing a configuration of an imaging system including a video camera and smartphones according to a first exemplary embodiment.

FIG. 1 is a view showing a configuration of an imaging system including video camera 100 and smartphones 200a, 200b, 200c according to a first exemplary embodiment. Video camera 100 can establish communication with a plurality of smartphones 200a, 200b, 200c. Video camera 100 can receive video data (moving image data or still image data) generated by respective smartphones 200a, 200b, 200c. Video camera 100 can superimpose the video data, which is received from at least one of the plurality of smartphones 200a, 200b, 200c, on video data captured by video camera 100 itself, and can record the superimposed video data in a recording medium (that is, a multi-wipe function (details will be described later)).

[1. Configuration]

Hereinafter, configurations of video camera 100 and smartphones 200a, 200b, 200c according to the first exemplary embodiment will be described. Note that, when the smartphones 200a, 200b, 200c are not distinguished from one another in the following description, reference numeral "200" is used for the smartphones.

[1-1. Configuration of Video Camera]

Figure 2:
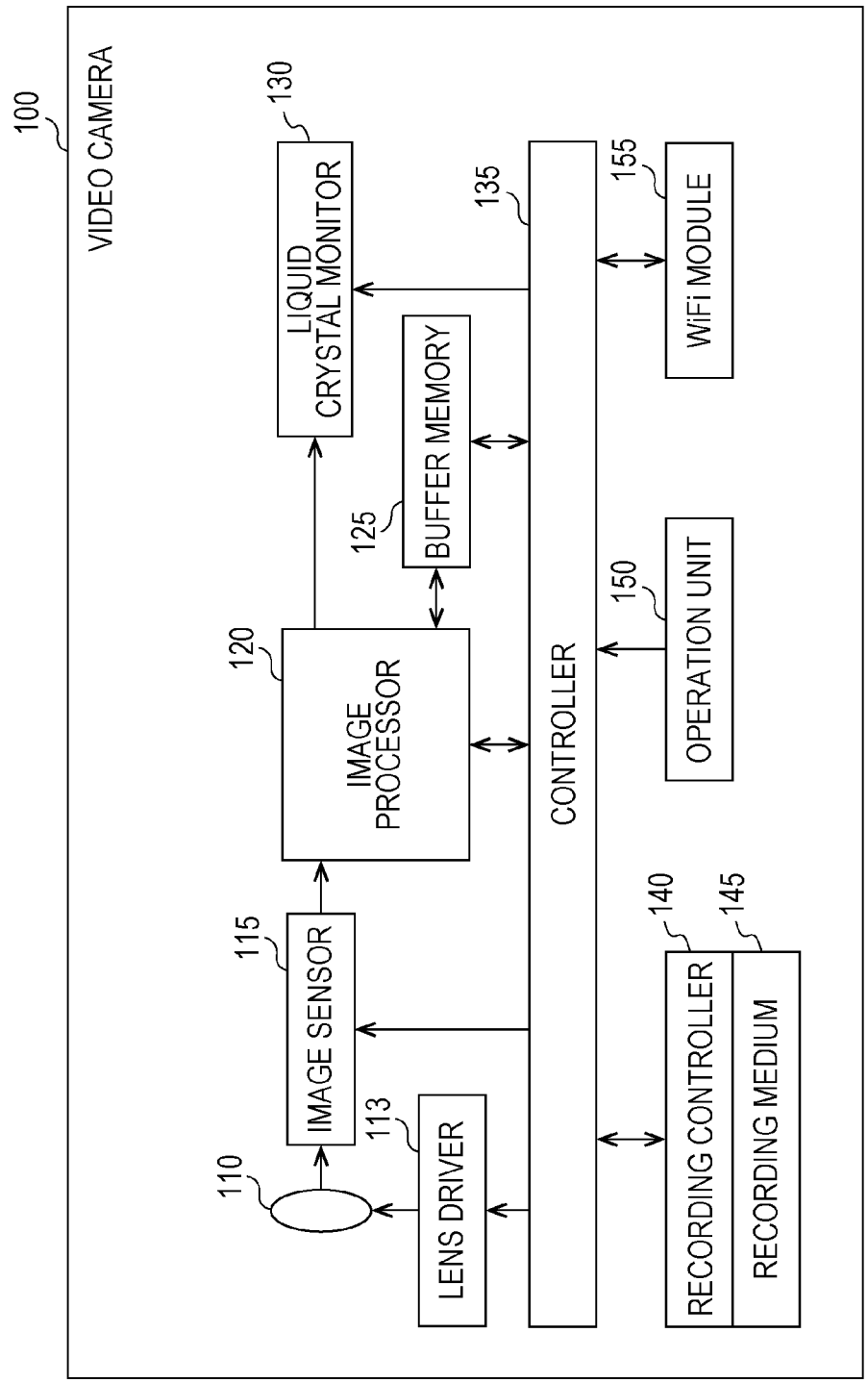
FIG. 2 is a diagram showing an electric configuration of the video camera according to the first exemplary embodiment.

FIG. 2 is a diagram showing an electric configuration of video camera 100 according to the first exemplary embodiment. Video camera 100 captures a subject image, which is formed via optical system 110, by image sensor 115. Image sensor 115 generates captured data (RAW data) that is based on the captured subject image. Image processor 120 performs a variety of processing for the captured data generated by image sensor 115, and generates video data. Controller 135 records, in recording medium 145, the video data generated in image processor 120. Controller 135 can live-display the video data, which is processed by image processor 120, on liquid crystal monitor 130. Controller 135 can read out the video data recorded in recording medium 145, and display (reproduce) the readout video data on liquid crystal monitor 130.

Optical system 110 includes a focus lens, a zoom lens, an optical image stabilizer (OIS) lens, a diaphragm, a shutter, and the like. A variety of the lenses included in optical system 110 may be formed of any number of lenses, or may be formed of any groups of lenses. The variety of lenses included in optical system 110 is driven by lens driving unit 113.

Image sensor 115 is a device that captures the subject image, which is formed via optical system 110, and generates the captured data. Image sensor 115 generates the video data (moving image data) at a predetermined frame rate (for example, 30 frames/second). Generation timing of the captured data and an electronic shutter operation in image sensor 115 are controlled by controller 135. Image sensor 115 is configured, for example, by a CCD (Charge Coupled Device) image sensor, a CMOS (Complementary Metal Oxide Semiconductor) image sensor, or an NMOS (n-Channel Metal Oxide Semiconductor) image sensor.

Image processor 120 is a circuit, which performs a variety of processing for captured data output from image sensor 115, and generates video data. Image processor 120 performs the variety of processing for the video data read out from recording medium 145, and generates a video to be displayed on liquid crystal monitor 130. Examples of the variety of processing include white balance correction, gamma correction, YC conversion processing, electronic zoom processing, compression processing, expansion processing, and the like; however, are not limited to these. Image processor 120 may be configured by a hard-wired electronic circuit, or may be configured by a microcomputer using a program.

Liquid crystal monitor 130 is provided, for example, in a housing openably attached onto a side surface of a main body of video camera 100. Liquid crystal monitor 130 displays the video that is based on the video data processed in image processor 120. Note that, other monitors such as an organic EL (Electroluminescence) monitor may be used as a display device in place of the liquid crystal monitor.

Controller 135 generally controls operations of the whole of video camera 100. Controller 135 includes a CPU (Central Processing Unit) or an MPU (Micro Processing Unit), and realizes a function of video camera 100, which will be described later, by executing a predetermined program. Controller 135 may be integrated into a single semiconductor chip together with image processor 120 and the like. Controller 135 includes a ROM (Read Only Memory) (not shown) therein. The ROM stores an SSID (Service Set Identifier) and a WEP key (Wired Equivalent Privacy Key), which are necessary to establish WiFi communication with other communication devices. Controller 135 can read out the SSID and the WEP key from the ROM according to need. The ROM stores a program for generally controlling the operations of the whole of video camera 100 as well as a program that relates to autofocus control (AF control) or communication control.

Buffer memory 125 is a recording medium that functions as a work memory of image processor 120 and controller 135. Buffer memory 125 is realized by a DRAM (Dynamic Random Access Memory) or the like.

Recording controller 140 controls recording of the video data in recording medium 145 and reproduction of the video data from recording medium 145. Recording medium 145 is an SSD (Solid State Drive) including a flash memory therein. Recording medium 145 may be configured by a hard disc drive (HDD) or a detachable memory card in place of the SSD. Recording medium 145 can store the video data generated by image processor 120, and the like.

Operation unit 150 is a user interface that receives an operation by a user, and includes an operation button, an operation lever, a touch panel, and the like. Upon receipt of the operation by the user, operation unit 150 notifies controller 135 of a variety of operation instruction signals.

WiFi module 155 is a communication module (electronic circuit) that performs communication conforming to the communication standard IEEE (Institute of Electrical and Electronic Engineers) 802.11. Video camera 100 can communicate with other external devices (for example, smartphones 200a, 200b, 200c), on which WiFi modules are mounted, via WiFi module 155. Video camera 100 may directly communicate with the external devices via WiFi module 155, or may communicate with the external devices via an access point. Note that, in place of the WiFi module, a communication module may be used, which performs communication conforming to another communication standard (for example, communication standard IEEE 802.15.1, that is, Bluetooth (registered trademark)). WiFi module 155 can establish communication with a predetermined number (three or more) of the external devices.

[1-2. Configuration of Smartphone]

Figure 3:
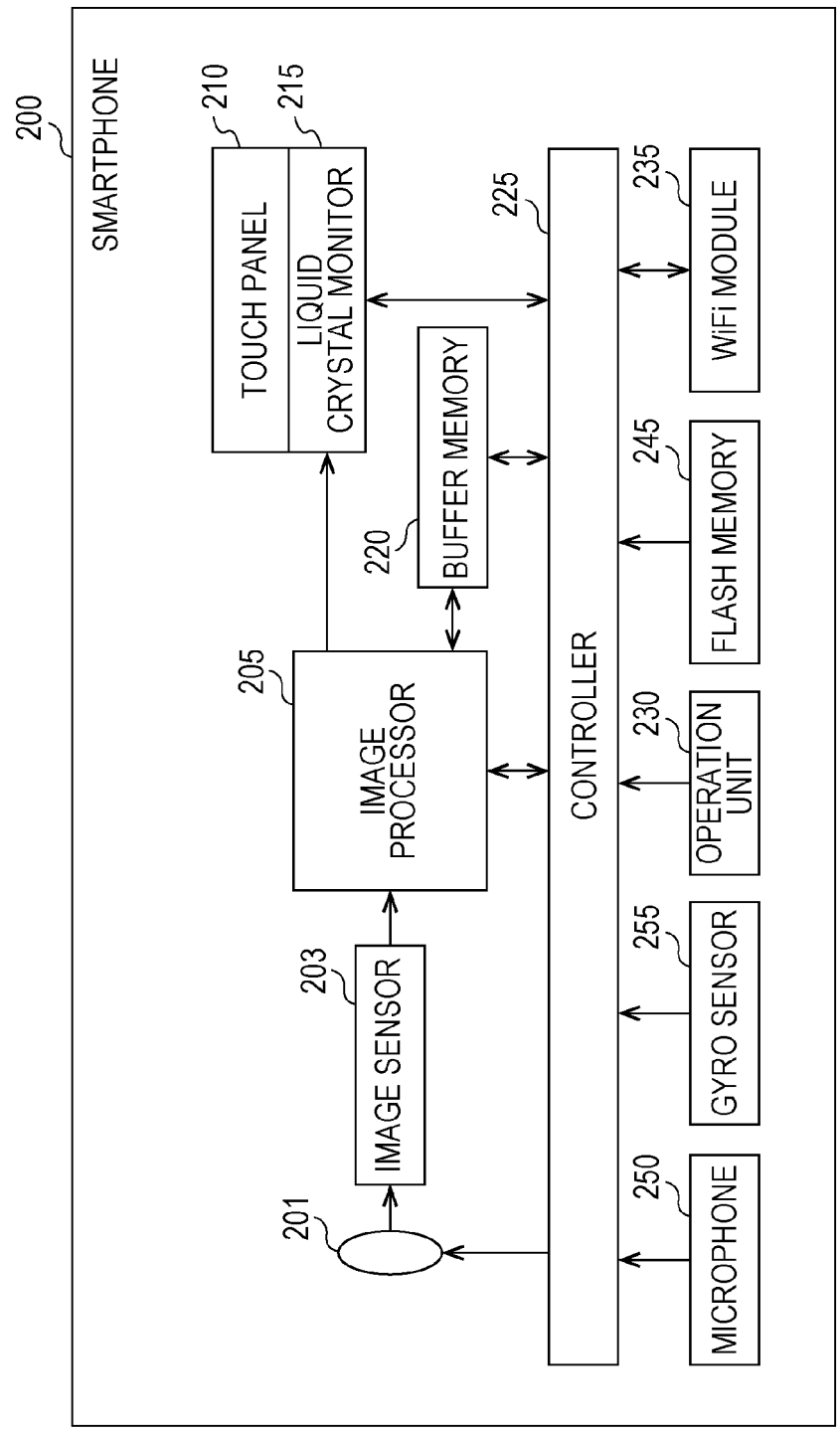
FIG. 3 is a diagram showing an electric configuration of each of the smartphones according to the first exemplary embodiment.

FIG. 3 is a diagram showing an electric configuration of smartphone 200 according to the first exemplary embodiment. Smartphone 200 generates the video data (moving image data) from the subject image, which is received via optical system 201, by image sensor 203. Smartphone 200 is communicable with video camera 100 via WiFi module 235. Smartphone 200 can transmit the generated video data to video camera 100 via WiFi module 235. Smartphone 200 can detect a movement (change in posture) of smartphone 200 itself by gyro sensor 255. Smartphone 200 receives a voice by microphone 250. The received voice is converted into audio data.

Image processor 205 performs a variety of processing for the video data generated by image sensor 203, and generates an image (live view image) to be displayed on liquid crystal monitor 215. The variety of processing includes the expansion processing and the like; however, is not limited to these. Image processor 205 may be configured by a hard-wired electronic circuit, or may be configured by a microcomputer using a program.

Touch panel 210 is an input device, which detects contact of a user's finger or the like, and outputs operation information to controller 225. Touch panel 210 is disposed on a surface of liquid crystal monitor 215. Touch panel 210 may be a resistive film type touch panel, an electrostatic capacitance type touch panel, or the like.

Liquid crystal monitor 215 is a display device that displays a screen designated from controller 225. For liquid crystal monitor 215, another type of display device (for example, an organic EL monitor) may be used in place of the liquid crystal monitor.

Buffer memory 220 is a memory for temporarily storing information necessary for controller 225 to execute a variety of processing operations.

Controller 225 controls operations of the respective units which configure smartphone 200. Controller 225 is electrically connected to image processor 205, touch panel 210, liquid crystal monitor 215, buffer memory 220, operation unit 230, and WiFi module 235. Controller 225 includes a CPU or an MPU, and a memory. Controller 225 realizes a function of smartphone 200, which will be described later, by executing a predetermined program (hereinafter, referred to as "video distribution application"). The video distribution application is stored in flash memory (hereinafter, simply referred to as "memory") 245.

WiFi module 235 is a communication module (circuit) that performs communication conforming to the communication standard IEEE 802.11. Smartphone 200 can communicate with another communication device, on which a WiFi module is mounted, via WiFi module 235. Smartphone 200 may directly communicate with the other communication device via WiFi module 235, or may communicate with the other communication device via an access point. Note that, in place of the WiFi module, a communication module may be used, which performs communication conforming to another communication standard (for example, communication standard IEEE 802.15.1, that is, Bluetooth (registered trademark)).

Smartphone 200 is communicable with video camera 100 via WiFi module 235, and can transmit and receive a variety of information to and from video camera 100.

Flash memory 245 stores the video data captured by smartphone 200, and the like.

Microphone 250 converts a voice, which is present outside smartphone 200, into an audio signal. Gyro sensor 255 is a sensor for measuring movement (angular acceleration) of smartphone 200. In addition to these, smartphone 200 may further include a GPS (Global Positioning System) module, which receives a positioning signal from at least one of an acceleration sensor that detects an acceleration of smartphone 200 and a GPS satellite, and measures a position of video camera 100.

[2. Operation]

[2.1 Multi-wipe Function]

Hereinafter, the multi-wipe function will be described. Video camera 100 can use a plurality of external electronic devices (hereinafter, referred to as "external devices") as sub cameras. Video camera 100 can receive videos (moving images), which are captured by the plurality of external devices, from the respective external devices, superimpose (synthesize) the received videos on a partial region of the video (moving image) captured by video camera 100, and display and record the superimposed videos. This function is referred to as "multi-wipe function". Note that, in this exemplary embodiment, the smartphones are used as examples of the sub cameras.

Video camera 100 can perform WiFi communication with smartphones 200a, 200b, 200c via WiFi module 155. At the time of executing the multi-wipe function, video camera 100 receives the video data (moving image data), which indicates the images captured by smartphones 200a, 200b, 200c, from smartphones 200a, 200b, 200c. Then, video camera 100 generates an image obtained by superimposing the videos (moving images), which are received from smartphones 200a, 200b, 200c, on a part of the video (moving image) captured by video camera 100 itself, displays the generated image (through image) on liquid crystal monitor 130, and records the generated image in recording medium 145 in accordance with user operation.

Figure 4:
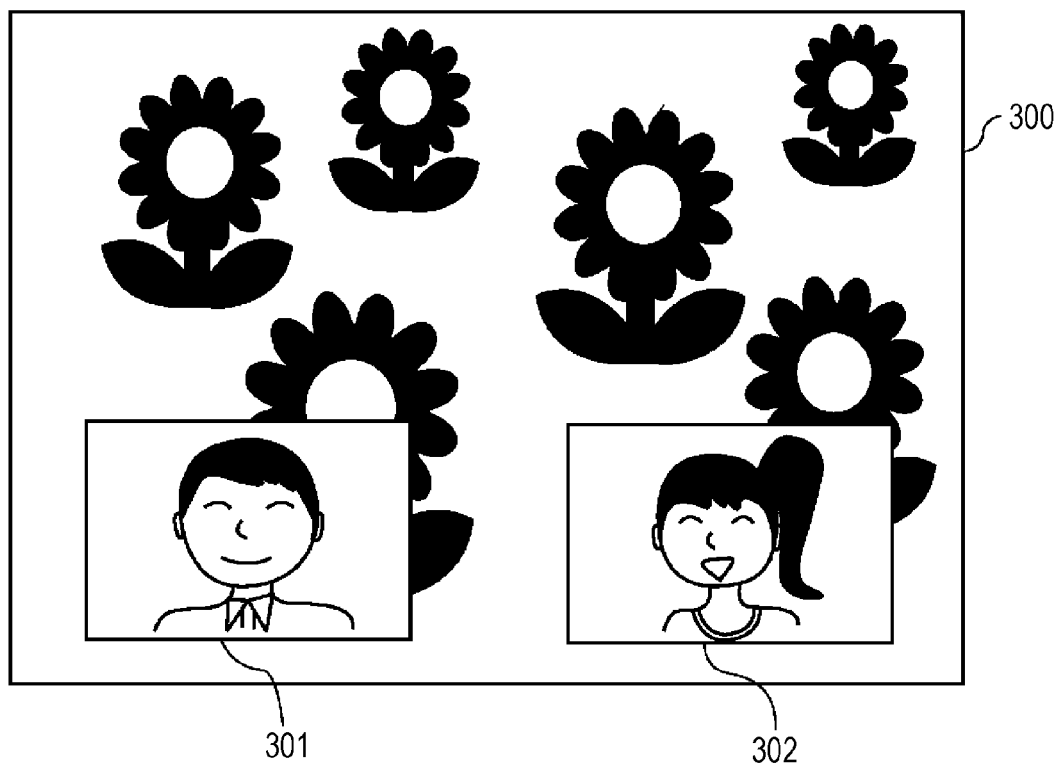
FIG. 4 is a view showing an example of an image according to the first exemplary embodiment, the image being displayed on a liquid crystal monitor of the video camera by a multi-wipe function.

FIG. 4 is a view showing an example of the image according to the first exemplary embodiment, the image being displayed on liquid crystal monitor 130 of video camera 100 by the multi-wipe function. As shown in FIG. 4, the videos received from smartphones 200a, 200b are superimposed (synthesized) as wipe images 301, 302, respectively on video 300 captured by video camera 100 (hereinafter, this captured video is referred to as "main image"). Here, in video camera 100 in this exemplary embodiment, an upper limit value of a number of the wipe images synthesized with the main image is set in the multi-wipe function. In this exemplary embodiment, as shown in FIG. 4, the upper limit value is set to "2" (as an example).

Figure 5:
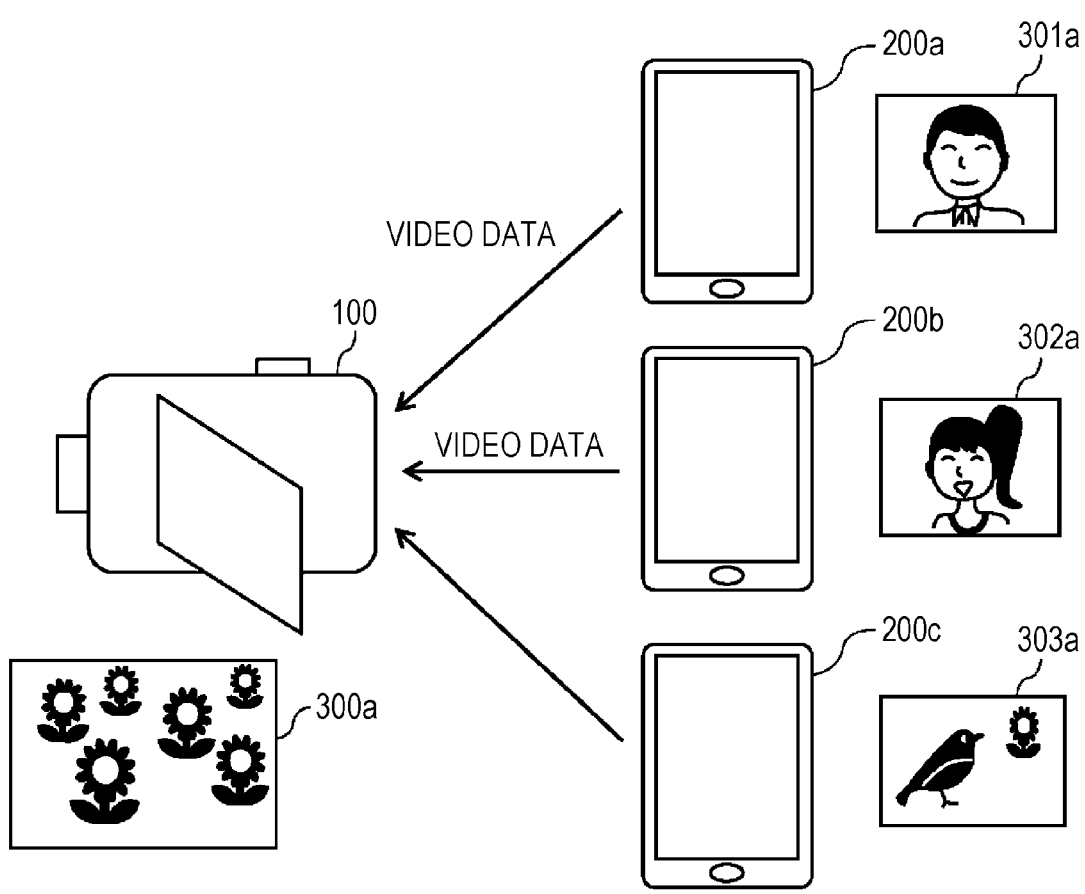
FIG. 5 is a view explaining images according to the first exemplary embodiment, the images being captured by the video camera and the smartphones.

FIG. 5 is a view explaining the images according to the first exemplary embodiment, the images being captured by video camera 100 and smartphones 200a, 200b, 200c. Video camera 100 captures an image of a subject, and generates video data indicating image 300a. Smartphone 200a generates video data indicating image 301a. Smartphone 200b generates video data indicating image 302a. Smartphone 200c generates video data indicating image 303a. Video camera 100 receives video data individually indicating images 301a, 302a from smartphones 200a and 200b. Here, video camera 100 does not receive video data from smartphone 200c. This is because the upper limit value of the number of wipe images superimposed on the main image is limited to "2" in the multi-wipe function. Video camera 100 synthesizes (superimposes) images 301a, 302a, which are indicated by the video data received from smartphones 200a, 200b, as the wipe images, with image 300a captured by video camera 100. In this way, a synthetic image as shown in FIG. 4 is generated, the synthetic image being obtained by synthesizing wipe images 301, 302 with main image 300. This synthetic image is displayed on liquid crystal monitor 130 of video camera 100. In the state shown in FIG. 4, when a predetermined operation for giving an instruction that recording of a moving image is to be started is performed by the user in video camera 100, the moving image is recorded in a state where wipe images 301, 302 are synthesized with (superimposed on) main image 300.

Figure 6:
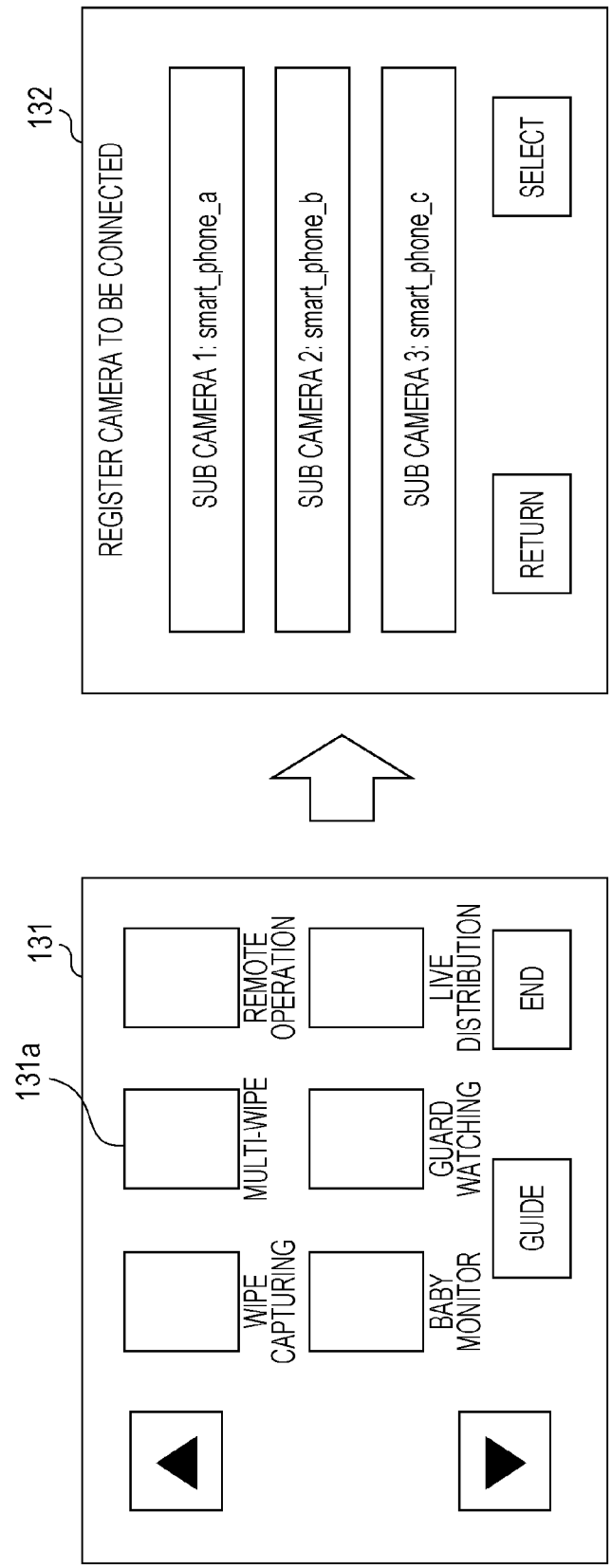
FIG. 6 is a diagram for explaining a registration operation for sub cameras, which is according to the first exemplary embodiment.
Figures 7, 8:
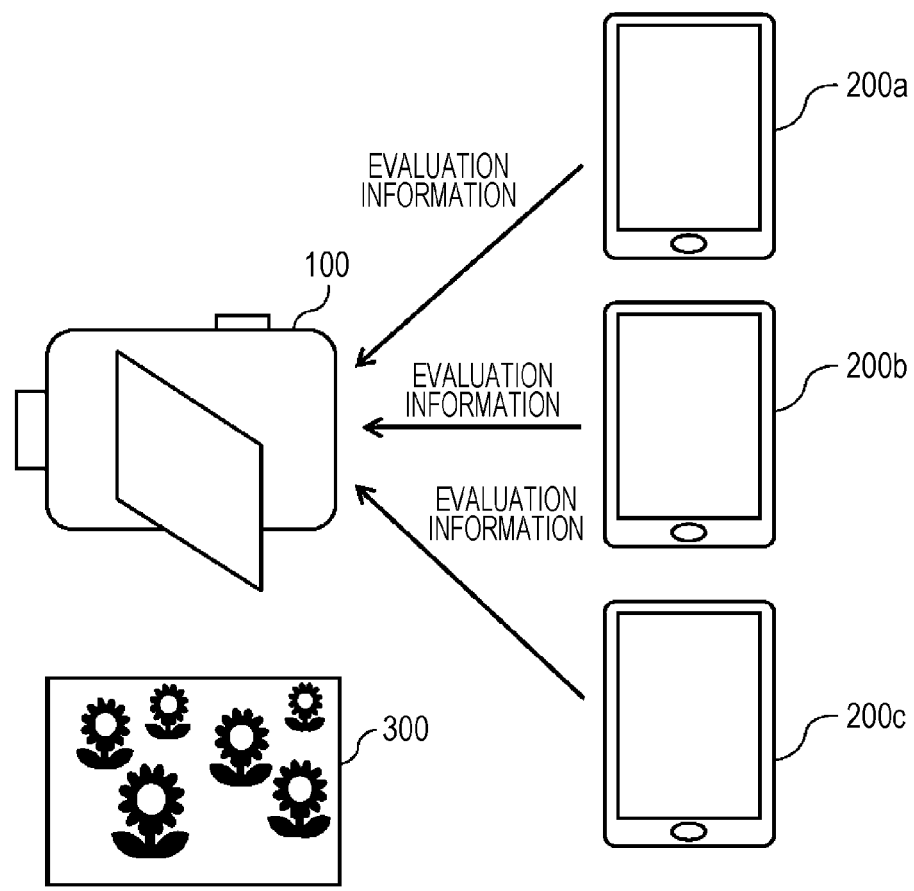
FIG. 7 is a diagram explaining registration information of the sub cameras, which is according to the first exemplary embodiment.
FIG. 8 is a view showing a state according to the first exemplary embodiment, in which only evaluation information is transmitted from the smartphones to the video camera.

Video camera 100 according to this exemplary embodiment registers in advance the external devices to be used as the sub cameras for the multi-wipe function. FIG. 6 is a diagram for explaining a registration operation for the sub cameras, which is according to the first exemplary embodiment. In FIG. 6, screen 131 is an example of a setting screen displayed on liquid crystal monitor 130 of video camera 100. A predetermined operation (for example, depression of a predetermined button) is performed in operation unit 150 of video camera 100, whereby setting screen 131 is displayed. A plurality of icons for setting a variety of functions is displayed on setting screen 131. When multi-wipe function setting icon 131a is selected by the user on setting screen 131, registration screen 132 is displayed. On registration screen 132, the user can register the external devices to be used as the sub cameras in the multi-wipe function. On registration screen 132, the user inputs device names of the external devices to be registered. When the registration on registration screen 132 is completed, sub camera registration information is generated (or updated). FIG. 7 is a diagram explaining the registration information of the sub cameras, which is according to the first exemplary embodiment. The registration information of the sub cameras manages the device names of the external devices to be registered as the sub cameras. The registration information of the sub cameras is stored in recording medium 145 in video camera 100. In the examples of FIG. 6 and FIG. 7, smartphones 200a, 200b, 200c (Device Name: smart_phone_a, smart_phone_b, smart_phone_c) are registered as the sub cameras.

In video camera 100 of this exemplary embodiment, an upper limit value of the number of devices which can be registered as the sub cameras for the multi-wipe function is set. In this exemplary embodiment, this upper limit value is set to "3" as an example.

[2.2 Selection of Wipe Image]

As mentioned above, in this exemplary embodiment, up to three external devices can be registered as the sub cameras in video camera 100. Video camera 100 can establish communication with three or more external devices at the same time via WiFi module 155. The upper limit value of the number of wipe images synthesized with the main image is set to "2" in the multi-wipe function.

Therefore, when three or more registered smartphones 200 (external devices) are connected to video camera 100, it is necessary to determine two smartphones 200, which provide the video data to be used as the wipe images, from among three or more smartphones 200.

Accordingly, video camera 100 of this exemplary embodiment receives evaluation information (details will be described later) indicating priority of the video data from each of smartphones 200. Based on the evaluation information, video camera 100 selects the video data to be used for the synthesis (in other words, selects the smartphones which provide the video data to be used for the synthesis). As described above, video camera 100 automatically selects the video data to be used as the wipe images (that is, selects sources of the video data). Hence, the user does not have to select the videos to be used as the wipe images, and convenience is enhanced.

[2.3 Selection Operation for Video to be Used for Wipe Image in Video Camera]

Figure 9:
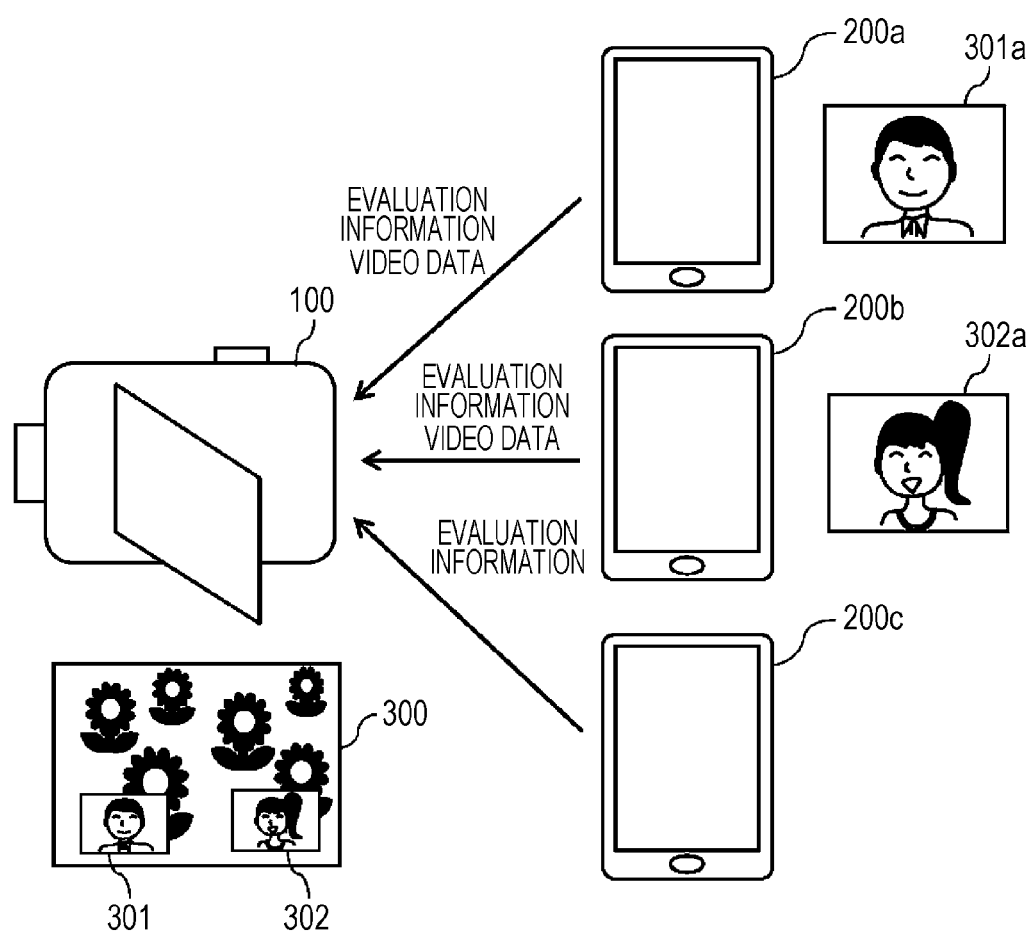
FIG. 9 is a view showing a state according to the first exemplary embodiment, in which the evaluation information and video data are transmitted from the smartphones to the video camera.

An outline of a selection operation for the videos to be used as the wipe images in video camera 100 will be described with reference to FIG. 8 and FIG. 9. FIG. 8 is a view showing a state according to the first exemplary embodiment, in which only the evaluation information is transmitted from smartphones 200a, 200b, 200c to video camera 100. FIG. 9 is a view showing a state according to the first exemplary embodiment, in which the evaluation information and the video data are transmitted from smartphones 200a, 200b, 200c to video camera 100.

When communication connections are established between video camera 100 and three smartphones 200a, 200b, 200c, as shown in FIG. 8, firstly, video camera 100 receives the evaluation information from smartphones 200a, 200b, 200c. At this time, video camera 100 does not receive the video data from smartphones 200a, 200b, 200c. Based on the evaluation information received from smartphones 200a, 200b, 200c, video camera 100 selects from which smartphones 200 the videos are to be used as the wipe images.

Next, video camera 100 transmits video distribution requests, which instruct smartphones 200a, 200b to distribute the video data, to smartphones 200a, 200b, wherein smartphones 200a, 200b provide the selected videos. As shown in FIG. 9, smartphones 200a, 200b, which receive the video distribution requests, transmit the video data together with the evaluation information to video camera 100. Meanwhile, smartphone 200c, which does not receive the video distribution request, transmits only the evaluation information to video camera 100 without transmitting the video data to video camera 100 (refer to FIG. 9). As described above, video camera 100 does not receive the video data from the smartphone that is not provided with the video for the wipe image. In this way, a shortage of a communication band, which occurs in the case of simultaneously receiving the video data from a large number of smartphones 200, can be suppressed, and in video camera 100, a frame drop or delay and degradation of image quality, which may occur in the case of reproducing the received video data, can be reduced.

Thereafter, video camera 100 synthesizes images 301, 302, which are indicated by the video data received from smartphones 200, as the wipe images with main image 300. Video data of the images thus synthesized is displayed on liquid crystal monitor 130, and is recorded in recording medium 145 in response to an instruction from the user.

Thereafter, based on the evaluation information received from smartphones 200a, 200b, 200c, video camera 100 determines smartphones 200, from which the pieces of video data are to be received, and allows smartphones 200 to distribute the videos so that the videos from the smartphones with higher evaluation information (that is, higher priority) can be used as the wipe images. In this way, even when a larger number of smartphones 200 than the upper limit value of the number of wipe images are connected to video camera 100, the video data to be used as the wipe images (that is, smartphones 200 which provide the video data) are automatically set, and accordingly, the convenience for the user is enhanced.

Figure 10:
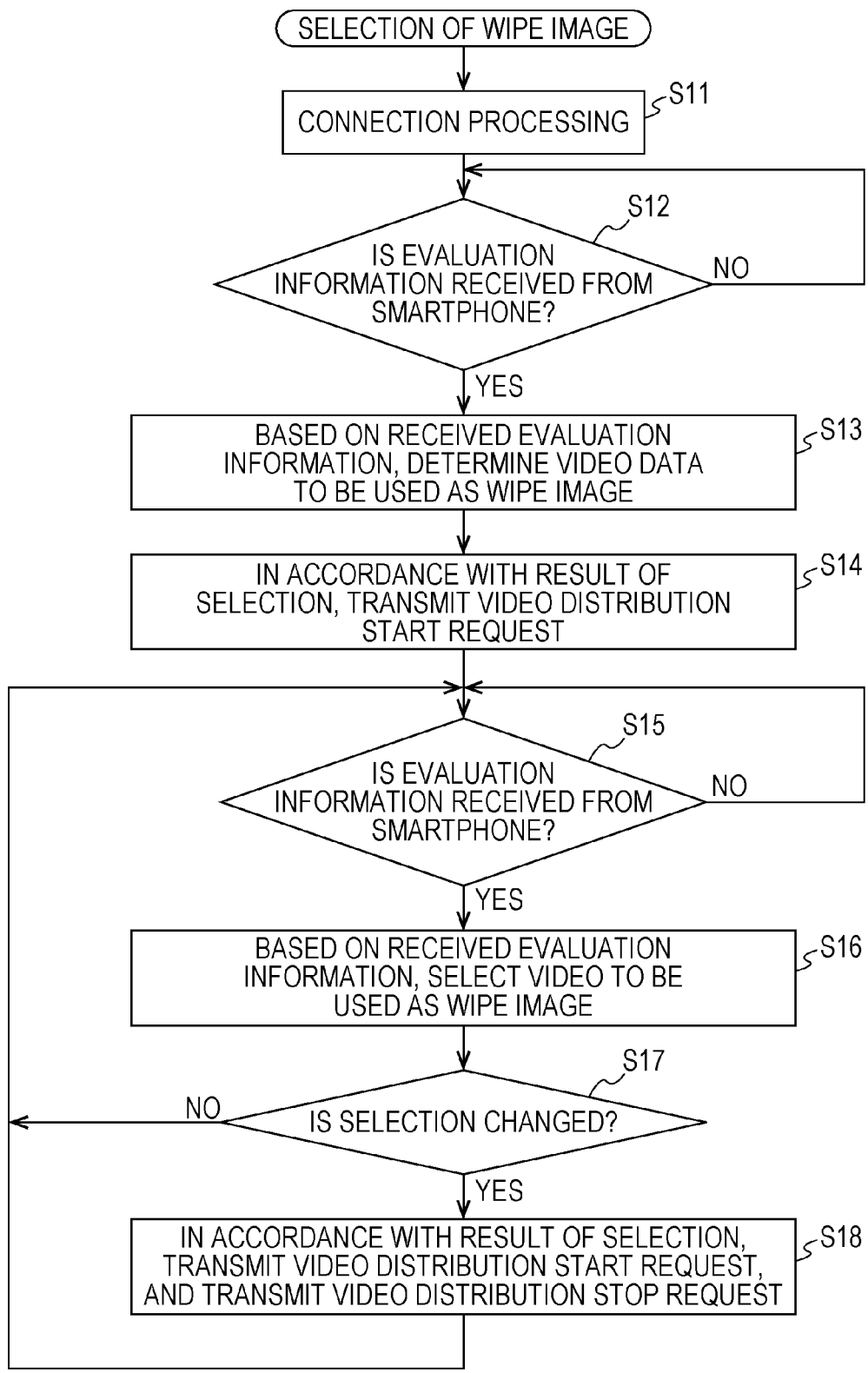
FIG. 10 is a flowchart showing selection processing for the video data for use in wipe images, the selection processing according to the first exemplary embodiment and performed in the video camera.

FIG. 10 is a flowchart showing a selection operation for the video data used in the wipe images, the selection operation according to the first exemplary embodiment and performed in video camera 100. Details of the selection operation for the video data used in the wipe images in video camera 100 will be described with reference to FIG. 10.

Upon detection of connectable smartphones 200 in the WiFi communication, controller 135 of video camera 100 performs connection processing (that is, establishment of the WiFi communication) for the detected smartphones according to the WiFi standard (Step S11). Therefore, for smartphones 200 to which video camera 100 is to be connected, video camera 100 holds in advance connection information (SSID, WEP key and the like), which is necessary for the connection in the WiFi communication, in recording medium 145.

Upon completion of the connection processing with smartphones 200 (Step S11), controller 135 of video camera 100 receives the evaluation information, which indicates the priorities calculated in respective smartphones 200, from smartphones 200 to which video camera 100 is connected (Step S12). At this point, video camera 100 receives only the evaluation information from respective smartphones 200, and does not receive the video data captured by respective smartphones 200 (refer to FIG. 8).

Upon receipt of the evaluation information from connected smartphones 200 (Y in Step S12), based on the evaluation information received from smartphones 200, controller 135 determines which video data among the video data received from respective smartphones 200 are to be used as the wipe images (Step S13). Specifically, controller 135 compares the priorities indicated by the evaluation information of respective smartphones 200, and specifies two smartphones 200 from the one with the highest priority. Controller 135 selects the video data, which is from the identified smartphone, as the video data to be used for the wipe images.

In accordance with a result of the selection, controller 135 transmits video distribution start requests, which instruct smartphones 200 to start the distribution of the videos, to smartphones 200, wherein smartphones 200 provide the video data selected as the video data to be used for the wipe images (Step S14). Upon receipt of the video distribution start requests from video camera 100, smartphones 200 start to transmit the video data to video camera 100 in addition to the evaluation information.

Thereafter, controller 135 periodically receives the evaluation information from respective smartphones 200 (Step S15). Based on the received evaluation information, controller 135 selects the videos to be used as the wipe images from the videos indicated by the video data received from respective smartphones 200 (Step S16). That is, controller 135 sets (selects) the smartphones which provide the videos to be used as the wipe images based on the evaluation information received from respective smartphones 200.

When the selection of the videos to be used as the wipe images is changed as a result of selecting the smartphones (Y in Step S17), controller 135 individually transmits the video distribution start request, which instructs smartphone 200 related to the change to start the video distribution, to smartphone 200 concerned, and a video distribution stop request, which instructs smartphone 200 related to the change to stop the video distribution, to smartphone 200 concerned (Step S18).

Figure 11:
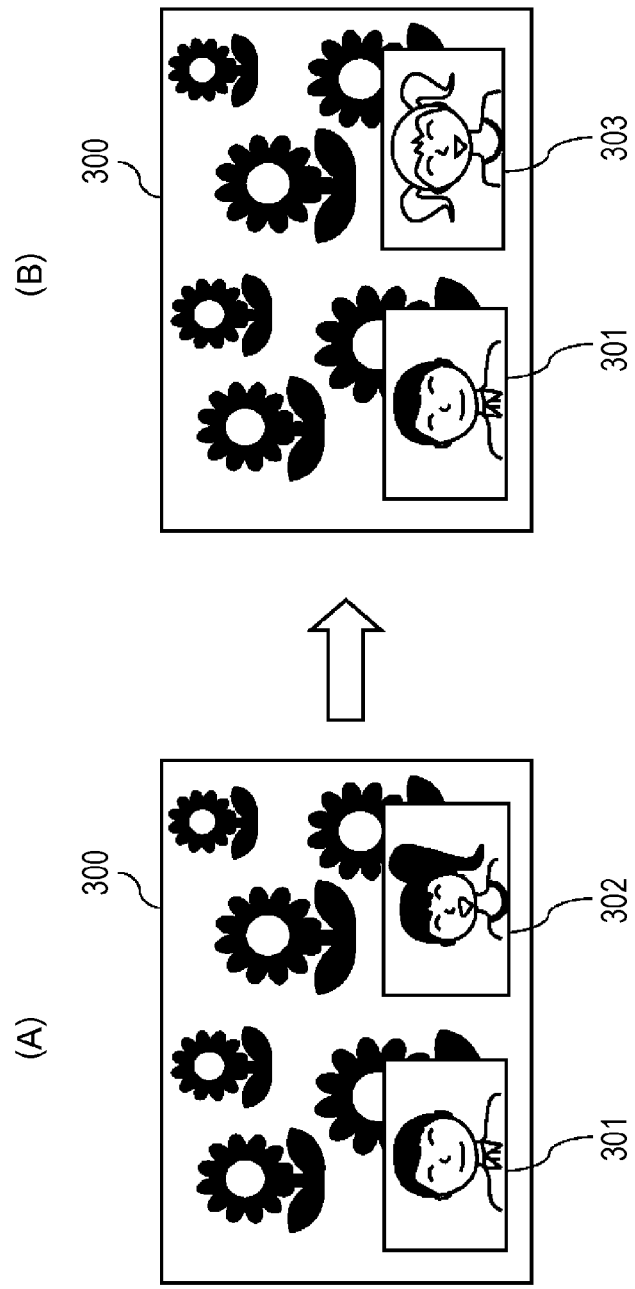
FIG. 11 is a view explaining switching of the wipe image, which is according to the first exemplary embodiment.

FIG. 11 is a view explaining switching of the wipe image, which is according to the first exemplary embodiment. For example, as shown in part (A) of FIG. 11, firstly, it is assumed that image 301 from smartphone 200a and image 302 from smartphone 200b are selected as the wipe images. In this state, when a value (priority) indicated by the evaluation information from smartphone 200c is higher than a value indicated by the evaluation information from smartphone 200b, image 303 from smartphone 200c is newly selected as the wipe image. Therefore, image 302 from smartphone 200b is not selected as the wipe image. At this time, controller 135 transmits the video distribution start request to smartphone 200c, and transmits the video distribution stop request to smartphone 200b. In this way, smartphone 200c starts to distribute the video data, and smartphone 200b stops distribution of the video data. At this time, the synthetic image generated by video camera 100 is changed from the image shown in part (A) of FIG. 11 to an image shown in part (B) of FIG. 11.

[2.3 Video Distribution Operation in Smartphone]

Figure 12:
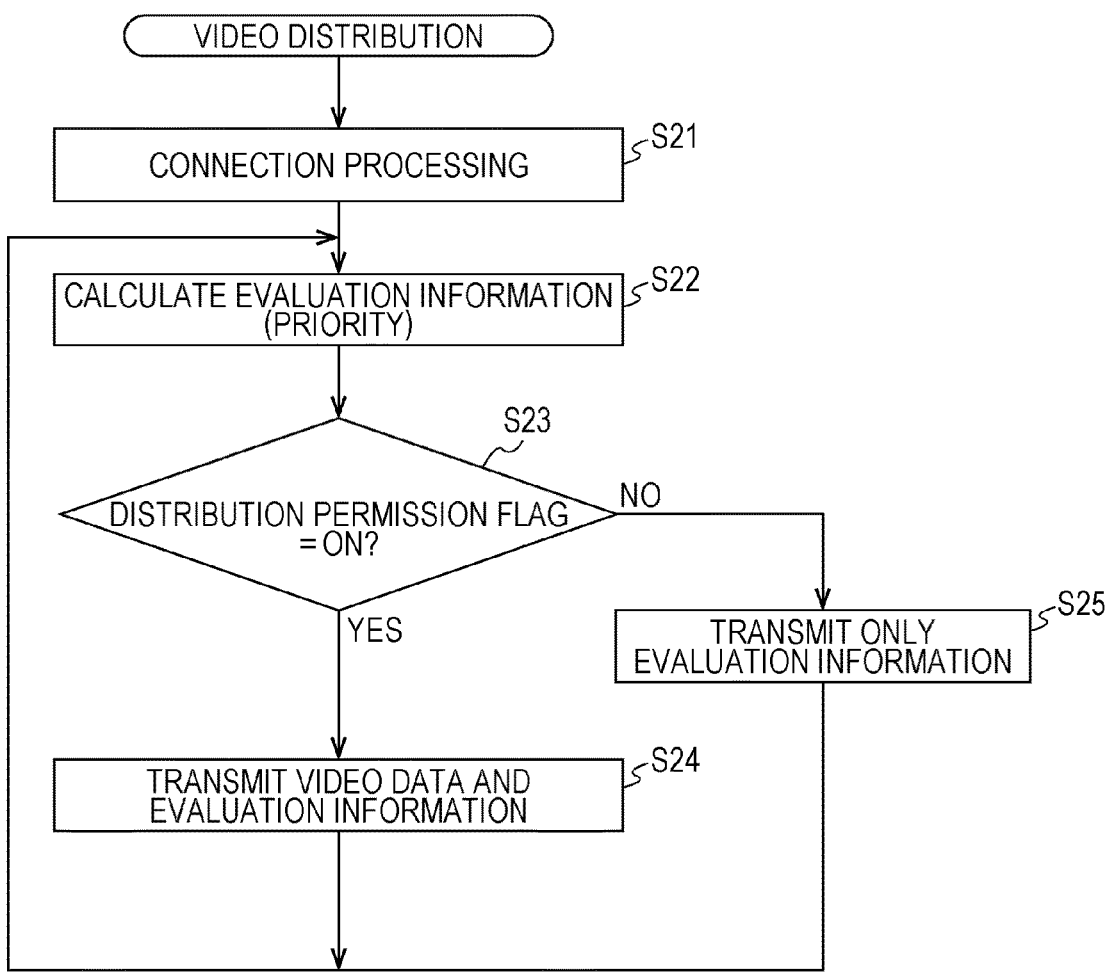
FIG. 12 is a flowchart showing video distribution processing in each of the smartphones, which is according to the first exemplary embodiment.

FIG. 12 is a flowchart showing video distribution processing in smartphone 200, which is according to the first exemplary embodiment. The video distribution processing in smartphone 200 will be described with reference to FIG. 12.

When communication connection processing with video camera 100 is established (Step S21), controller 225 of smartphone 200 calculates the evaluation information indicating the priority with regard to the video data to be transmitted to video camera 100 (Step S22).

Here, the priority is a value indicating the order of priority when the video data transmitted from smartphone 200 is used as the wipe image. The priority is calculated in consideration of a variety of conditions. The variety of conditions include, for example, following conditions.

Human face (a video including a human face is to be preferentially used for a wipe image)

Change in subject (movement of video, movement of camera) (a video with a change in a subject is to be preferentially used for a wipe image compared to a video without a change in the subject)

Change in voice (a video with a change in voice is to be preferentially used for a wipe image compared to a video without a change in voice)

In this exemplary embodiment, the priority is calculated so that a score of the video including the human face becomes high. At this time, the priority can be calculated, for example, by a following formula.

$$\text{Priority} = (Fn \times \alpha) + (Vn \times \beta) + \{(1 - Jn) \times \gamma\} \quad (1)$$

Here, Fn is a number of faces detected by a face detection function. Vn is a volume (amplitude of an audio signal) picked up by microphone 250. Jn is a variation of an inclination of a smartphone, which is detected by gyro sensor 255. α, β, γ are coefficients, and for example, are set to α=60, β=15, γ=20.

In Formula (1), the number (Fn) of faces detected by the face detection function, the volume (Vn) of the voice input via the microphone, and the movement (variation of the inclination) (Jn) of the smartphone are individually used as parameters. In Formula (1), in order to preferentially calculate the value of the video including the human face, coefficient a for parameter Fn with regard to the face detection is set larger than other coefficients β, γ.

FIG. 13 is a view showing examples of the parameters of Formula (1) according to the first exemplary embodiment. Values of the respective parameter are set to take values between 0 and 1.0. The value of parameter Fn indicating the number of faces to be detected is set so as to become larger (upper limit value is present) as the number of detected persons is lager, for example, when priority is given to detection of faces of plural persons. Moreover, when priority is given to detection of a face of one person, the value of parameter Fn is set so as to become larger as the number of detected persons is closer to "one person".

Note that the calculation formula for the priority, which is described above, is an example, and the calculation formula of the present disclosure is not limited to Formula (1). Formula (1) is a formula for calculating the priority in order to preferentially display the video, which includes the human face, as the wipe image; however, may be a formula giving priority to the change in the video. In this case, as the parameters for calculating the priority, parameters indicating change in the video data only need to be set, the parameters including information indicating a positional change of the smartphone (detection results of the acceleration sensor and the gyro sensor), a motion vector, and the like.

That is, in the calculation formula for the priority, parameters can be appropriately set in response to conditions. For example, the priority may be calculated based on only one of the above three parameters, or may be calculated by arbitrarily combining the three parameters. Alternatively, the priority may be calculated by using other parameters (movement of the subject and the like) in addition to or in place of the above three parameters.

In FIG. 12, after calculating the evaluation information (Step S22), controller 225 of smartphone 200 determines whether or not a distribution permission flag is set to "ON" (Step S23). Here, the distribution permission flag is a flag indicating whether or not smartphone 200 is in a state where the distribution of the video data is permitted (requested) from video camera 100. The distribution permission flag is set to "ON" when the distribution of the image data is permitted (requested) from video camera 100, and is set to "OFF" when the distribution of the video data is not permitted (requested) from video camera 100. Setting processing for the distribution flag will be described later.

When the distribution permission flag is set to "ON" (Y in Step S23), controller 225 transmits the video data, which is captured in smartphone 200 together with the evaluation information to video camera 100 (Step S24). Meanwhile, when the distribution permission flag is set to "OFF" (N in Step S23), controller 225 does not transmit the video data, but transmits only the evaluation information to video camera 100 (Step S25).

Figure 14:
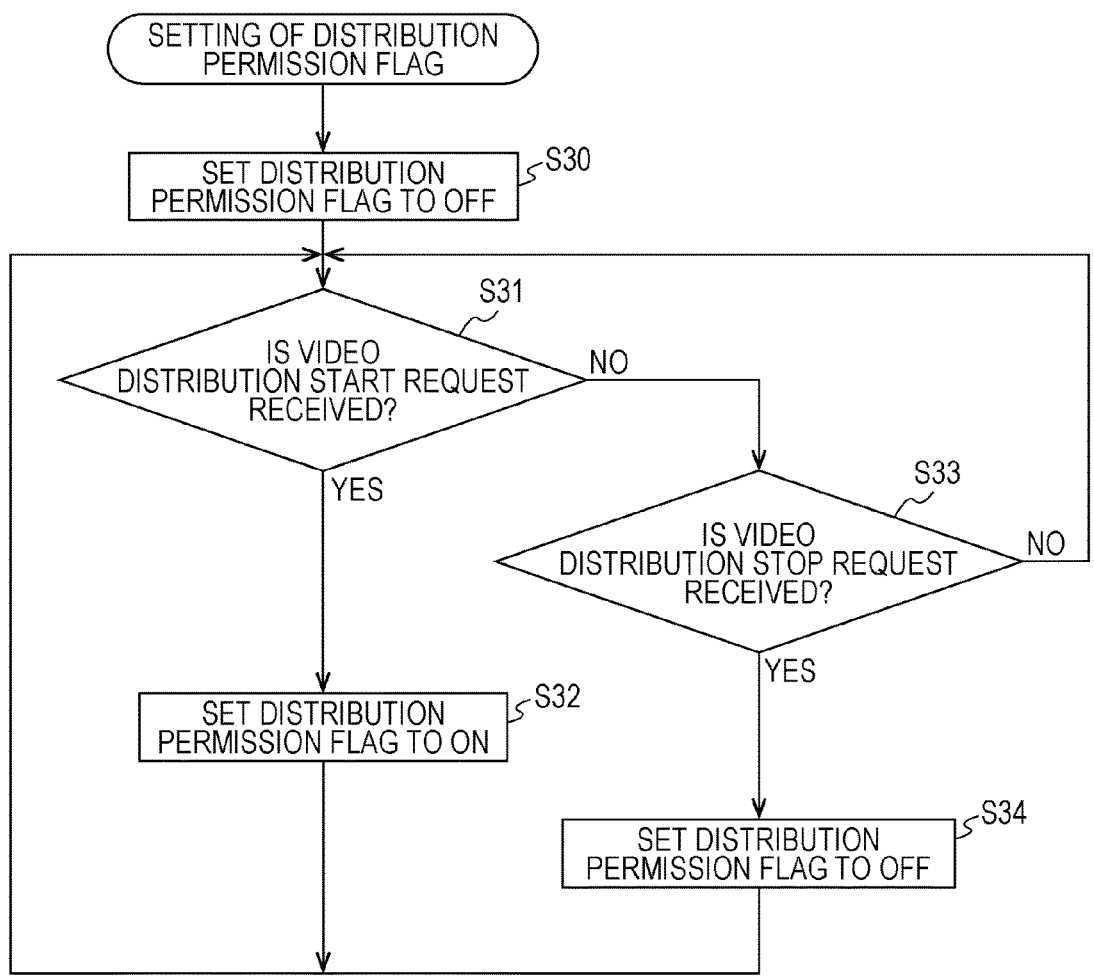
FIG. 14 is a flowchart showing setting processing according to the first exemplary embodiment, which is performed for a distribution permission flag in the smartphone.

FIG. 14 is a flowchart showing the setting processing according to the first exemplary embodiment, which is performed for the distribution permission flag in smartphone 200. The setting processing for the distribution permission flag will be described with reference to FIG. 14.

Firstly, controller 225 of smartphone 200 sets (initializes) the distribution permission flag to "OFF" (Step S30). Thereafter, at the time of receiving the video distribution start request from video camera 100 (Y in Step S31), controller 225 sets the distribution permission flag to "ON" (Step S32). Moreover, at the time of receiving the video distribution stop request from video camera 100 (Y in Step S33), controller 225 sets the distribution permission flag to "OFF" (Step S34). As described above, the distribution permission flag is set according to the reception of the video distribution start request and the video distribution stop request.

FIG. 15, FIG. 16, FIG. 17A and FIG. 17B are diagrams explaining a communication sequence between video camera 100 and smartphones 200.

Figure 15:
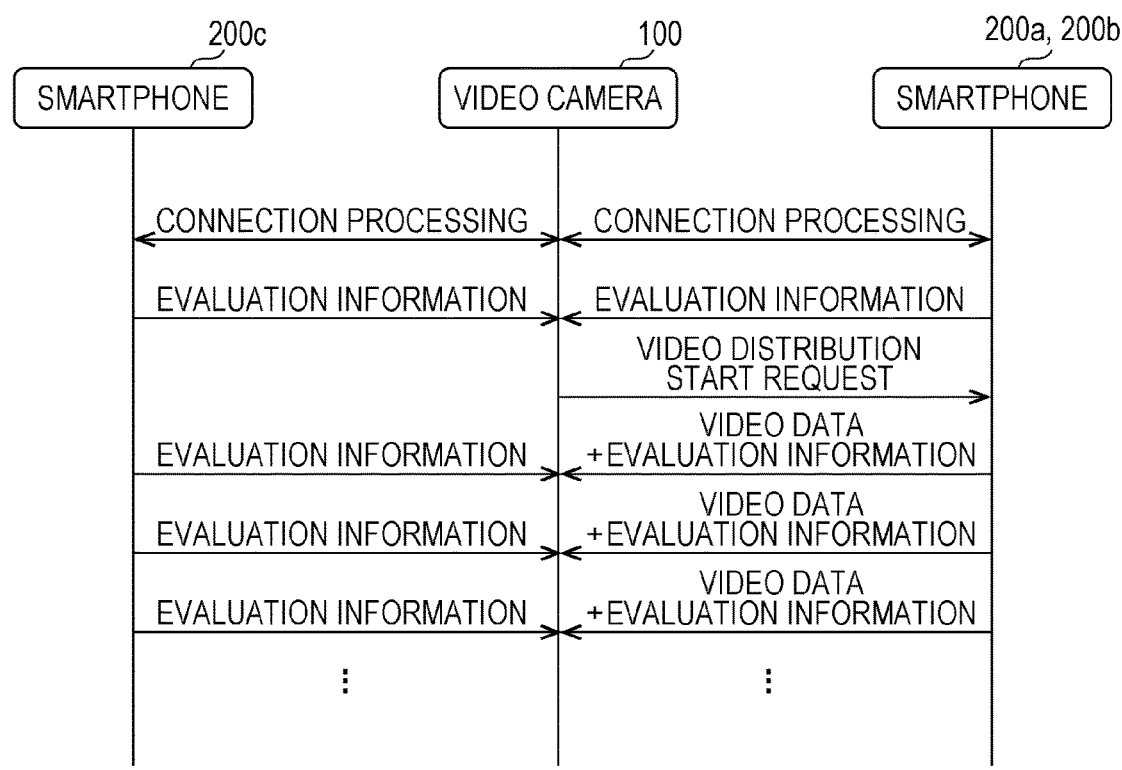
FIG. 15 is a chart showing an example of a communication sequence according to the first exemplary embodiment, which is between the video camera and the smartphones.

FIG. 15 is a chart showing an example of such a communication sequence according to the first exemplary embodiment, which is between video camera 100 and smartphones 200a, 200b, 200c. FIG. 15 shows communication immediately after video camera 100 and smartphones 200a, 200b, 200c are connected to each other. Such an example of FIG. 15 shows the case where, after the communication connection between video camera 100 and smartphones 200a, 200b, 200c is established, the video distribution start request is transmitted from video camera 100 to smartphones 200a, 200b, and the video distribution start request is not transmitted from video camera 100 to smartphone 200c (refer to FIG. 9). In this case, smartphones 200a, 200b, which have received the video distribution start request, transmit the video data and the evaluation information to video camera 100. Meanwhile, smartphone 200c, which has not received the video distribution start request, does not transmit the video data to video camera 100, but transmits only the evaluation information to video camera 100.

Figure 16:
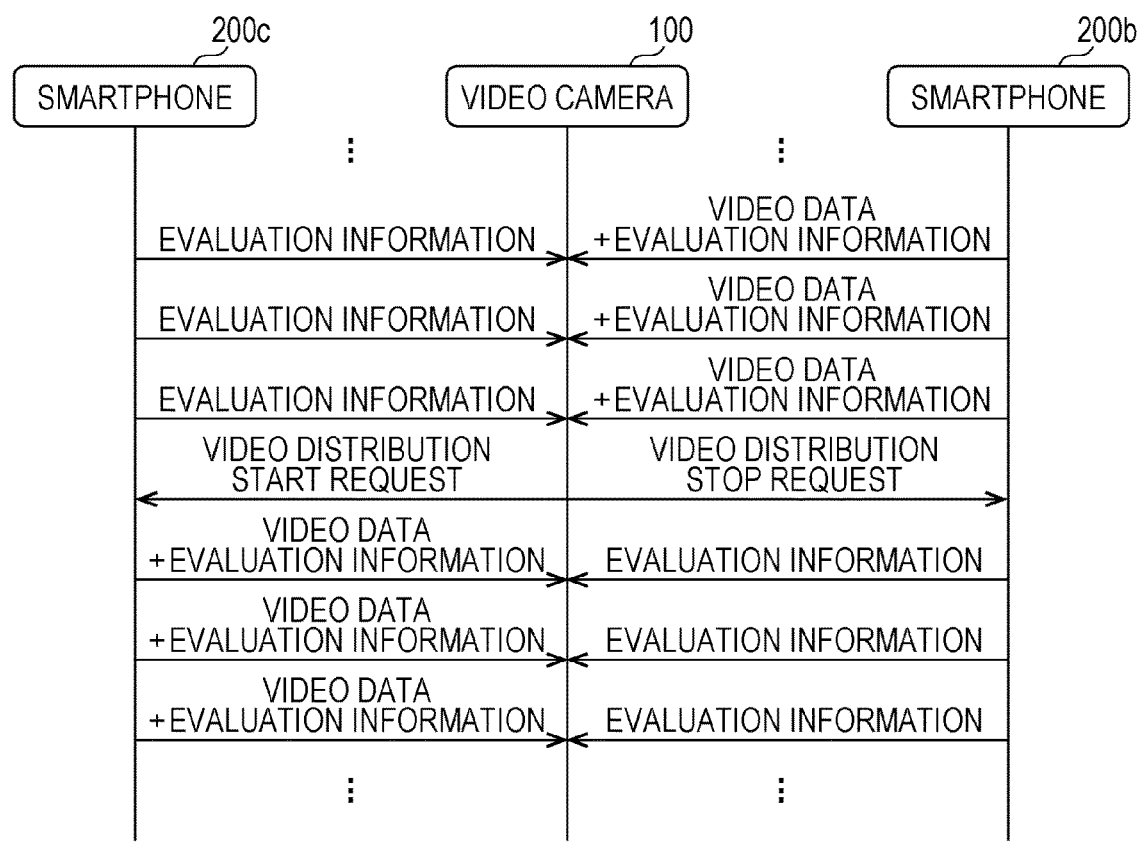
FIG. 16 is a chart showing an example of a communication sequence according to the first exemplary embodiment, which is performed between the video camera and the smartphones at the time when the wipe image is switched.

FIG. 16 is a chart showing an example of a communication sequence according to the first exemplary embodiment, which is performed between the video camera and the smartphones at the time when the wipe image is switched. In FIG. 16, firstly, the video from smartphone 200a and the video from smartphone 200b are selected as the videos to be used for the wipe images. In this case, one of the images to be used for the wipe images is switched from the video from smartphone 200b to the video from smartphone 200c.

Video camera 100 switches one of the videos to be used as the wipe images from the video from smartphone 200b to the video from smartphone 200c based on the evaluation information received from smartphones 200a, 200b, 200c. For this purpose, video camera 100 transmits the video distribution stop request, which instructs smartphone 200b to stop the video distribution, to smartphone 200b, and transmits the video distribution request to smartphone 200c.

Upon receipt of the video distribution stop request, smartphone 200b stops distribution of the video data, and thereafter, transmits only the evaluation information to video camera 100. Meanwhile, upon receipt of the video distribution request, smartphone 200c transmits the video data and the evaluation information to video camera 100. In this way, one of the wipe images is switched from the video from smartphone 200b to the video from smartphone 200c.

[2.4 Change in Attribute of Wipe Image]

Figure 17A:
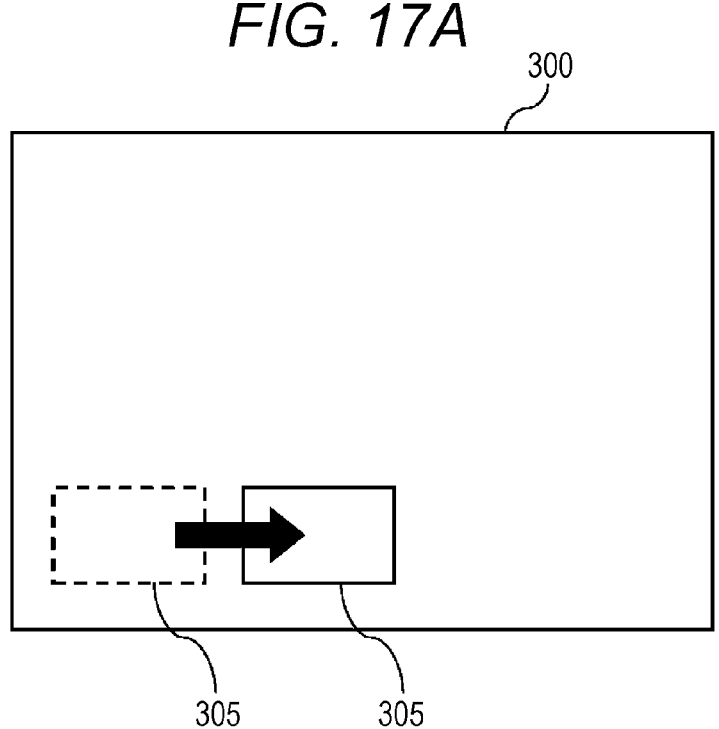
FIG. 17A is a view explaining a wipe image according to the first exemplary embodiment, in which an attribute (display position) is changed based on the evaluation information.
Figure 17B:
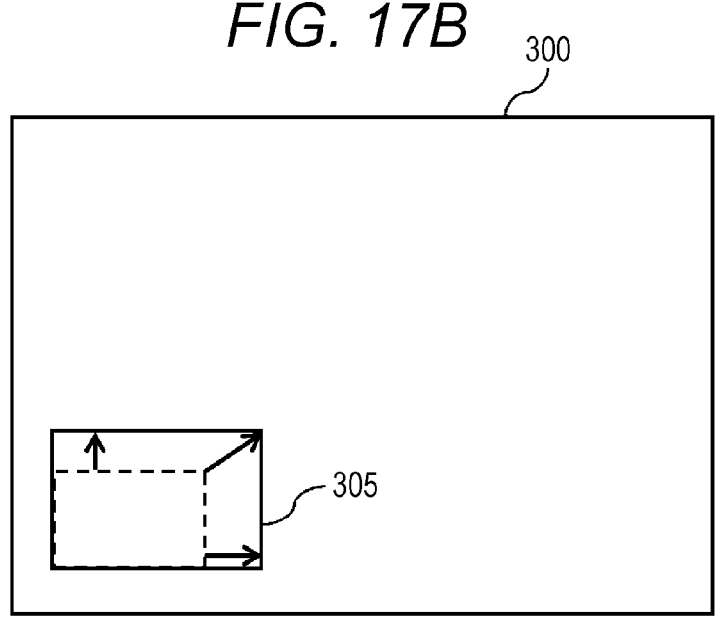
FIG. 17B is a view explaining a wipe image according to the first exemplary embodiment, in which an attribute (size) is changed based on the evaluation information.

FIG. 17A is a view explaining a wipe image according to the first exemplary embodiment, in which an attribute (display position) is changed based on the evaluation information. FIG. 17B is a view explaining a wipe image according to the first exemplary embodiment, in which an attribute (size) is changed based on the evaluation information. Controller 135 may change the attribute of the wipe image, which is to be synthesized with and displayed on the main image, based on such a priority value indicated by the evaluation information. For example, as shown in FIG. 17A, controller 135 may move the display position of wipe image 305 to the right as the priority value indicated by the evaluation information becomes lower. As shown in FIG. 17B, controller 135 may increase the size of wipe image 305 as the priority value indicated by the evaluation information becomes higher.

[3. Effect and the Like]

As described above, video camera 100 (an example of an imaging apparatus) of this exemplary embodiment includes: image sensor 115 (an example of a first imaging unit) that captures the image of the subject and generates the video data (an example of first video data); WiFi module 155 (an example of a first communication unit) that communicates with the plurality of smartphones 200 (examples of electronic devices) and receives the video data (examples of second video data) generated by respective smartphones 200 and the evaluation information indicating the priorities of the video data; image processor 120 (an example of an image processor) that performs the synthesis processing of synthesizing the video indicated by the generated video data and the video data serving as the wipe image and received from at least one of the plurality of smartphones 200; and controller 135 (an example of a first controller) that controls the synthesis processing in image processor 120. Based on the evaluation information received from each of the plurality of smartphones 200, controller 135 selects the smartphone that provides the video data to be used for the synthesis processing.

Smartphone 200 of this exemplary embodiment is an electronic device that transmits the video data to video camera 100. Smartphone 200 includes: image sensor 203 (an example of a second imaging unit) that captures the image of the subject and generates the video data (an example of second video data); WiFi module 235 (an example of a second communication unit) that communicates with video camera 100; and controller 225 (an example of a second controller) that calculates the evaluation information, and controls transmission of the video data and the evaluation information to video camera 100. Upon receipt of the distribution start request for the video data from video camera 100, controller 225 transmits the video data and the evaluation information to video camera 100. Thereafter, upon receipt of the distribution stop request for the video data from video camera 100, controller 225 stops the transmission of the video data to video camera 100, and transmits the evaluation information to video camera 100.

With the configuration described above, video camera 100 automatically sets the videos to be used as the wipe images from the videos received from respective smartphones 200 based on the evaluation information. In this way, in a state where the plurality of smartphones 200 are connected to video camera 100, the wipe images are automatically set, and the convenience for the user is enhanced.

Here, the evaluation information may be calculated based on at least one of the number of faces detected in the videos indicated by the video data, the volume detected by at least one smartphone 200, and the variation of the inclination of at least one smartphone 200.

The upper limit value of the number of smartphones 200 which provide the video data to be used for the synthesis processing only needs to be smaller than the upper limit value of the number of smartphones 200 communicable via WiFi module 155.

Controller 135 only needs to select smartphones 200, in each of which the priority indicated by the evaluation information is larger than the predetermined value, as smartphones 200 which provide the video data to be used for the synthesis processing.

Moreover, WiFi module 155 receives the evaluation information and the video data from smartphones 200 which provide the video data to be used for the synthesis processing, and from smartphone 200 that does not provide the video data to be used for the synthesis process, receives the evaluation information, but does not receive the video data. In this way, the shortage of the communication band between video camera 100 and smartphones 200 can be suppressed, and in video camera 100, the frame drop or delay and the degradation of the image quality, which may occur in the case of reproducing the received video data, can be reduced.

Moreover, the imaging system of this exemplary embodiment includes video camera 100 and smartphones 200.

Other Exemplary Embodiments

The present disclosure is not limited to the above exemplary embodiment, and a variety of exemplary embodiments are conceivable. Hereinafter, other exemplary embodiments will be described collectively.

In the first exemplary embodiment, the evaluation information (priority) is calculated in each of smartphones 200; however, the evaluation information may be calculated in the video camera 100. In this case, smartphone 200 may transmit information to be used for calculating the evaluation information (priority) to video camera 100 instead of transmitting the evaluation information thereto. For example, smartphone 200 only needs to transmit a result of detecting the faces to be detected in smartphone 200, the volume, a detection result by the gyro sensor, and the like to video camera 100. Video camera 100 only needs to calculate the evaluation information (priority) for each of smartphones 200 based on the information received from each of smartphones 200.

In the first exemplary embodiment, the smartphones are used as the electronic devices which provide the videos to be displayed as the wipe images; however, other electronic devices may be used. That is, a variety of electronic devices (for example, a video camera, a digital camera, a cellular phone, a tablet terminal, and a camera-equipped personal computer), which are capable of communicating with video camera 100 and capable of transmitting the video data to video camera 100, can be used as the sub cameras.

Video camera 100 may further include a sub imaging unit (sub camera) in addition to the main imaging unit (main camera) including optical system 110 and image sensor 115. In this case, in accordance with the above control, video camera 100 may select the videos to be displayed as the wipe images from among the videos received from smartphones 200 and a video captured by the sub imaging unit (sub camera).

In the first exemplary embodiment, the upper limit value of the number of devices which can be registered as the sub cameras is set to "3", and the maximum number of wipe images displayable in video camera 100 is set to "2"; however, these numeric values are merely examples. These numeric values can be appropriately set in accordance with the use or restriction of the system.

In the first exemplary embodiment, each of controller 135 of video camera 100 and controller 225 of smartphone 200 is configured to include a CPU or an MPU, which executes a program. However, each of controller 135 and controller 225 may be configured by a hard-wired electronic circuit, or may be configured by a microcomputer or the like. That is, each of controller 135 and controller 225 can be configured by a CPU, an MPU, a DSU (Digital Service Unit), an FPGA (Field-Programmable Gate Array), an ASIC (Application Specific Integrated Circuit), a microcomputer, or the like.

The exemplary embodiments have been described above as the examples of the technique in the present disclosure. For this purpose, the accompanying drawings and the detailed description have been provided.

Hence, the constituent elements described in the accompanying drawings and the detailed description can include not only constituent elements, which are essential for solving the problem, but also constituent elements, which are provided for illustrating the above technique, and are not essential for solving the problem. Therefore, it should not be immediately recognized that such inessential constituent elements are essential by the fact that the inessential constituent elements are illustrated in the accompanying drawings or described in the detailed description.

Moreover, the above exemplary embodiments are described for illustrating the technique in the present disclosure. Thus, various modifications, replacements, additions, and omissions may be made within the scope of the claims or the equivalents thereof.

The present disclosure is useful for an imaging apparatus (for example, a video camera), which is capable of receiving video data from a plurality of external devices, and capable of recording an image obtained by synthesizing an image indicating the received video data with an image captured by the apparatus itself.

What is claimed is:

1. An imaging apparatus comprising:
   a first imaging unit that captures an image of a subject and generates first video data;
   a first communication unit that communicates with a plurality of electronic devices, and receives second video data generated by the plurality of electronic devices and evaluation information indicating priorities of the second video data;
   an image processor that performs synthesis processing of synthesizing first video and second video, the first video being indicated by the first video data, and the second video being indicated by the second video data received from at least one electronic device of the plurality of electronic devices; and
   a first controller that controls the synthesis processing in the image processor,
   wherein the first controller selects the at least one electronic device of the plurality of electronic devices based on the evaluation information received from each of the plurality of electronic devices, the at least one electronic device providing the second video data to be used for the synthesis processing, and
   wherein the evaluation information is calculated based on at least one of a number of faces detected in the second video indicated by the second video data, a volume detected by the at least one electronic device, and a variation of an inclination of the at least one electronic device.

2. The imaging apparatus according to claim 1, wherein the imaging apparatus is a video camera.

3. The imaging apparatus according to claim 1, wherein the first video is a main image and the second video is a wipe image.

4. The imaging apparatus according to claim 1, wherein the evaluation information are number values.

5. The imaging apparatus according to claim 1, wherein the evaluation information are calculated by the plurality of electronic devices.

6. An imaging apparatus comprising:
   a first imaging unit that captures an image of a subject and generates first video data;
   a first communication unit that communicates with a plurality of electronic devices, and receives second video data generated by the plurality of electronic devices and evaluation information indicating priorities of the second video data;
   an image processor that performs synthesis processing of synthesizing first video and second video, the first video being indicated by the first video data, and the second video being indicated by the second video data received from at least one electronic device of the plurality of electronic devices; and
   a first controller that controls the synthesis processing in the image processor,
   wherein the first controller selects the at least one electronic device of the plurality of electronic devices based on the evaluation information received from each of the plurality of electronic devices, the at least one electronic device providing the second video data to be used for the synthesis processing, and
   wherein the first communication unit
   receives the evaluation information and the second video data from the at least one electronic device of the plurality of electronic devices that receives a distribution request, and
   receives the evaluation information and does not receive the second video data from another electronic device of the plurality of electronic devices that does not receive the distribution request.

7. The imaging apparatus according to claim 6, wherein the imaging apparatus is a video camera.

8. An electronic device that transmits the second video data to the imaging apparatus according to claim 6, the electronic device comprising:
   a second imaging unit that captures an image of a subject and generates the second video data;
   a second communication unit that communicates with the imaging apparatus; and
   a second controller that calculates the evaluation information, and controls transmission of the second video data and the evaluation information to the imaging apparatus,
   wherein the second controller
   transmits the second video data and the evaluation information to the imaging apparatus upon receipt of a distribution start request for the second video data from the imaging apparatus, and
   thereafter, upon receipt of a distribution stop request for the second video data from the imaging apparatus, stops transmission of the second video data to the imaging apparatus, and transmits the evaluation information to the imaging apparatus.

9. The electronic device according to claim 8, wherein the electronic device is a smartphone.

10. The imaging apparatus according to claim 6, wherein the first video is a main image and the second video is a wipe image.

11. The imaging apparatus according to claim 6, wherein the evaluation information are number values.

12. The imaging apparatus according to claim 6, wherein the evaluation information are calculated by the plurality of electronic devices.

13. An imaging apparatus comprising:
   a first imaging unit that captures an image of a subject and generates first video data;

a first communication unit that communicates with a plurality of electronic devices, and receives second video data generated by the plurality of electronic devices and evaluation information indicating priorities of the second video data;

an image processor that performs synthesis processing of synthesizing first video and second video, the first video being indicated by the first video data, and the second video being indicated by the second video data received from at least one electronic device of the plurality of electronic devices; and a first controller that controls the synthesis processing in the image processor, wherein the first controller selects the at least one electronic device of the plurality of electronic devices based on the evaluation information received from each of the plurality of electronic devices, the at least one electronic device providing the second video data to be used for the synthesis processing, and wherein an upper limit value of a number of the second video to be synthesized with the first video is set.

14. The imaging apparatus according to claim 13, wherein the imaging apparatus is a video camera.

15. The imaging apparatus according to claim 13, wherein the upper limit value of the number of the plurality of electronic devices which provide the second video data to be used for the synthesis processing is smaller than an upper limit value of a number of electronic devices communicable via the first communication unit.

16. The imaging apparatus according to claim 15, wherein the first controller selects an electronic device, in which a priority indicated by the evaluation information is larger than a predetermined value, as the at least one electronic device that provides the second video data to be used for the synthesis processing.

17. The imaging apparatus according to claim 13, wherein the first video is a main image and the second video is a wipe image.

18. The imaging apparatus according to claim 13, wherein the evaluation information are number values.

19. The imaging apparatus according to claim 13, wherein the evaluation information are calculated by the plurality of electronic devices.

* * * * *